United States Patent
Huang et al.

(10) Patent No.: US 12,046,247 B2
(45) Date of Patent: *Jul. 23, 2024

(54) SELECTIVE FORWARD ERROR CORRECTION FOR SPATIAL AUDIO CODECS

(71) Applicant: Dolby Laboratories Licensing Corporation, San Francisco, CA (US)

(72) Inventors: Shen Huang, Beijing (CN); Michael Eckert, Ashfield (AU); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/702,698

(22) Filed: Mar. 23, 2022

(65) Prior Publication Data

US 2022/0215847 A1     Jul. 7, 2022

Related U.S. Application Data

(63) Continuation of application No. 16/928,918, filed on Jul. 14, 2020, now Pat. No. 11,289,103, which is a
(Continued)

(30) Foreign Application Priority Data

Dec. 21, 2017    (WO) ................ PCT/CN2017/117802
Feb. 16, 2018    (EP) ..................................... 18157081

(51) Int. Cl.
*G10L 19/005*      (2013.01)
*G10L 19/008*      (2013.01)
(Continued)

(52) U.S. Cl.
CPC .......... *G10L 19/005* (2013.01); *G10L 19/008* (2013.01); *G10L 19/0212* (2013.01);
(Continued)

(58) Field of Classification Search
CPC ........ G10L 19/008; G10L 19/005; H04L 1/00
See application file for complete search history.

(56) References Cited

U.S. PATENT DOCUMENTS 6,675,340 B1    1/2004    Hardie
7,447,977 B2   11/2008    Bauer
(Continued)

FOREIGN PATENT DOCUMENTS

WO     2007015125     2/2007

OTHER PUBLICATIONS

Hardman, V. et al "Reliable Audio for Use Over the Internet" Proc. Inet, Jun. 1, 1995, pp. 1-8.
(Continued)

*Primary Examiner* — Jialong He

(57) ABSTRACT

Systems and methods for providing forward error correction for a multi-channel audio signal are described. Blocks of an audio stream are buffered into a frame. A transformation can be applied that compacts the energy of each block into a plurality of transformed channels. The energy compaction transform may compact the most energy of a block into the first transformed channel and to compact decreasing amounts of energy into each subsequent transformed channel. The transformed frame may be encoded using any suitable codec and transmitted in a packet over a network. Improved forward error correction may be provided by attaching a low bit rate encoding of the first transformed channel to a subsequent packet. To reconstruct a lost packet, the low bit rate encoding of the first channel for the lost packet may be combined with a packet loss concealment
(Continued)

version of the other channels, constructed from a previously-received packet.

2 Claims, 7 Drawing Sheets

Related U.S. Application Data continuation of application No. 16/228,690, filed on Dec. 20, 2018, now Pat. No. 10,714,098.

(60) Provisional application No. 62/621,176, filed on Jan. 24, 2018.

(51) Int. Cl.
  *G10L 19/02* (2013.01)
  *H04L 1/00* (2006.01)
  *H04S 3/00* (2006.01)

(52) U.S. Cl.
  CPC .......... *H04L 1/0011* (2013.01); *H04L 1/0041* (2013.01); *H04S 3/008* (2013.01); *H04S 2400/01* (2013.01)

(56) References Cited

U.S. PATENT DOCUMENTS

| | | | |
|---|---|---|---|
| 8,352,279 B2 | 1/2013 | Gao | |
| 8,452,606 B2 | 5/2013 | Vos | |
| 9,166,735 B2 | 10/2015 | Vafin | |
| 9,173,048 B2 | 10/2015 | McGrath | |
| 9,312,929 B2 | 4/2016 | Forenza | |
| 9,344,218 B1 | 5/2016 | Liu | |
| 9,460,728 B2 * | 10/2016 | Boehm | G10L 19/008 |
| 9,460,729 B2 | 10/2016 | Dickins | |
| 9,495,970 B2 | 11/2016 | Dickins | |
| 9,502,046 B2 * | 11/2016 | Purnhagen | H04M 3/56 |
| 9,514,755 B2 | 12/2016 | Huang | |
| 9,530,422 B2 | 12/2016 | Klejsa | |
| 9,653,085 B2 | 5/2017 | Truman | |
| 10,043,523 B1 | 8/2018 | Zopf | |
| 2003/0187663 A1 | 10/2003 | Truman | |
| 2004/0022231 A1 | 2/2004 | Morrish | |
| 2004/0078194 A1 | 4/2004 | Liljeryd | |
| 2005/0182996 A1 | 8/2005 | Bruhn | |
| 2009/0201805 A1 | 8/2009 | Begen | |
| 2011/0029684 A1 | 2/2011 | Campana | |
| 2011/0305344 A1 | 12/2011 | Sole | |
| 2014/0086416 A1 | 3/2014 | Sen | |
| 2014/0088957 A1 | 3/2014 | Kapilow | |
| 2014/0093086 A1 | 4/2014 | Zhao | |
| 2014/0317475 A1 | 10/2014 | Rozenberg | |
| 2016/0148618 A1 | 5/2016 | Huang | |
| 2017/0019210 A1 | 1/2017 | Yu | |
| 2017/0076735 A1 | 3/2017 | Beack | |
| 2017/0103761 A1 | 4/2017 | Sun | |
| 2017/0104552 A1 | 4/2017 | Sun | |

OTHER PUBLICATIONS

Kuo, Chun-I. et. al., "Performance modeling of FEC-based unequal error protection for H.264/avc video streaming ove burst-loss channels", vol. 30, Issue 1, Jan. 10, 2017, pp. 1-18.

McCoy, E.C. et al. "Issues for Consideration in the Development of an Acoustical Design System Supporting Interactive Auralisation" AES, Nov. 11, 1996.

Westerlund, M. et al "RTP Topologies" Internet Engineering Task Force, Nov. 2015, pp. 1-48.

Wu, H. et al "Adjusting forward error correction with temporal scaling for TCP-friendly streaming MPEG", Apr. 2003, ACM Transactions on Multimedia Computing, Communications, and Applications (TOMCCAP) vol. 1, No. Nov. 4, 2005 Computer Science Technical Report Series, pp. 1-18.

Perkins et al., "A survey of packet loss recovery techniques for streaming audio." IEEE Network 12.5 (1998): 40-48. (Year: 1998), pp. 1-9.

Perkins et al., "RFC 2198 RTP Payload for Redundant Audio Information," Networking Group, Standards Track, Sep. 1997, pp. 1-11.

* cited by examiner

SELECTIVE FORWARD ERROR CORRECTION FOR SPATIAL AUDIO CODECS

CROSS-REFERENCE TO RELATED APPLICATIONS

This patent application is a continuation application of U.S. patent application Ser. No. 16/928,918 filed on Jul. 14, 2020, which is a continuation application of U.S. patent application Ser. No. 16/228,690 filed on Dec. 20, 2018, now U.S. Pat. No. 10,714,098, which claims the benefit of priority from International Patent Application No. PCT/CN2017/117802 filed Dec. 21, 2017. U.S. Provisional Patent Application No. 62/621,176, filed on Jan. 24, 2018; and European Patent Application No. 18157081.3, filed on Feb. 16, 2018, each one incorporated by reference in its entirety.

TECHNICAL FIELD

Embodiments herein relate generally to audio signal processing, and more specifically to reducing complexity and bit rate overhead of forward error correction for multi-channel audio signals when applied after packet loss during transmission over a packet-switched network.

SUMMARY OF THE INVENTION

Systems and methods for providing forward error correction for a multi-channel audio signal are described. Blocks of a captured audio stream, which may include signals from one or more microphones, are buffered into a frame. For example, a three-microphone capture may result in a sequence of blocks that include three channels of audio, where each channel represents samples from one of the microphones. These blocks of audio are buffered into a frame, typically consisting of twenty milliseconds of audio for many voice applications. A transformation, such as a mixing matrix, can be applied to each block of audio samples that compacts the energy of each block into a plurality of transformed channels. The energy compaction transform may be implemented to compact the most energy of a block into the first transformed channel and to compact decreasing amounts of energy into each subsequent transformed channel. Examples of such a transformation used as a mixing matrix may be a Karhunen Loueve Transform ("KLT") coding or Singular Value Decomposition ("SVD"). Typically, this mixing matrix may be fixed for a frame of audio, but the mixing matrix may vary for each frame of audio in some embodiments. Each channel of audio can then be encoded into a frame using any suitable codec (e.g., EVS, Dolby Voice codec, Opus, etc.). The encoded frame, which may include all channels of encoded audio, may then be transmitted in packets over a network.

Improved forward error correction may then be provided by attaching a low bit rate encoding of only the first channel (highest energy channel) into a subsequent frame, which is then transmitted in a subsequent packet. To reconstruct a frame of audio corresponding to a lost packet, the low bit rate encoding of the highest energy channel for the lost packet may be combined with a packet loss concealment version of the other channels, constructed from a previously-received packet. The combination of the low bit rate copy of the first channel with the packet loss concealment from the other channels may sufficiently recover a lost frame with reasonably high quality. In some embodiments, spatial parameters for the energy compaction transform applied to each audio block are also included with both the transmitted packets for a frame and the low bit rate encoding of the highest energy channel in the subsequent packet, where these parameters may be used to reconstruct the block corresponding to the lost packet using forward error correction.

While the above embodiments use the energy compaction transform to aid in providing more bit-efficient forward correction, alternative processing may be used. In some embodiments, the energy compaction transform can be replaced with an alternative mixing matrix, where the mixing matrix converts the captured signals to an Ambisonics format (e.g., a three-channel or four-channel format). The block of audio is buffered into a frame and each channel can be encoded by a relevant codec such as EVS, Dolby Voice Codec, Opus, etc. . . . . . In this case, Forward Error Correction may be implemented by encoding a low bit rate version of the first channel, the W channel for an Ambisonics representation, and including this low bit rate copy in a subsequent packet. The same approach as described above may be used to reconstruct a lost frame of audio, by utilizing the low bit rate copy of the first channel along with packet loss concealment techniques applied to the other channels to reconstruct the audio. A variation to this approach may be implemented by creating Forward Error Correction from more than the first channel, but fewer than the total number of channels. For example, a third order Ambisonics stream, consisting of 16 channels of audio, can have Forward Error Correction applied to only the first four channels, or the first order Ambisonics stream.

In other embodiments, a transform is used that attempts to assign the energy of audio objects in the scene to individual channels (instead of the energy compaction transform). An example of such a transform is described in U.S. Pat. No. 9,460,728, entitled "Method and apparatus for encoding multi-channel HOA audio signals for noise reduction, and method and apparatus for decoding multi-channel HOA audio signals for noise reduction" and assigned to Dolby Laboratories Licensing Corporation, Dolby International Ab of the Netherlands, which is hereby incorporated by reference. The transform, such as the adaptive Spherical Harmonic Transform described in U.S. Pat. No. 9,460,728, may be applied after converting the received audio frame into a higher-order Ambisonics ("HOA") representation. A subset of channels less than n, including the greatest amount of energy, may then be encoded using a lower bit-rate and transmitted with subsequent packets. The number of channels n being encoded may depend on the desired quality of the reconstruction of the lost packet. The alternative processing methods described herein may produce a similar result as energy compaction approaches.

BRIEF DESCRIPTION OF THE FIGURES

This disclosure is illustrated by way of example and not limitation in the figures of the accompanying drawings, in which like references indicate similar elements, and in which.

DETAILED DESCRIPTION

Figure 1:
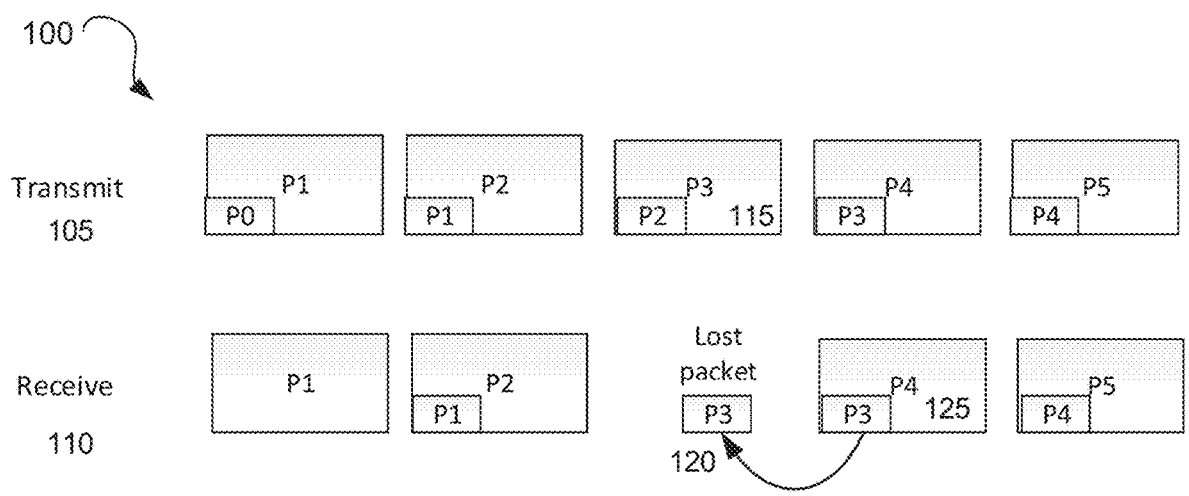
FIG. 1 shows a simplified block diagram of a transmitted encoded audio stream and received audio stream that uses forward error correction, according to an embodiment.

In real-time transmission of internet protocol ("IP") packets over a network, degradation of speech quality can be observed when packet loss occurs. Such degradation may be proportional to a packet loss rate and a burst ratio of the data stream. Two well-known techniques of compensating for packet loss are packet loss concealment and low bit-rate redundant forward error correction (see Perkins et al, "RTP Payload for Redundant Audio Data," Request for Comments 2198, September 1997, hereby incorporated by reference). In low bit-rate redundant forward error correction ("FEC"), a low bit-rate replication of a packet is attached to a later packet, thus allowing partial or full recovery if a packet is lost. The low bit-rate replication may be a low-bitrate version of every channel of the original block of the multi-channel transmitted audio stream, or may be a full bit rate version of every channel. FIG. 1 shows a simplified block diagram of a single-channel transmitted encoded audio stream 105 and received audio stream 110 that uses low bit-rate FEC, according to an embodiment. In the received audio stream 110, packet P3 115 from the transmitted stream 105 is lost. Using low bit-rate FEC, the low bit-rate copy of P3 120, contained in received packet P4 125, may be decoded and used for playback in place of packet P3 115. The recovered packet is generally of lower-quality than the original transmitted packet, and generally extra delay is needed for the decoder to recover the information for the lost packet from the subsequent packet. The temporary reduction in quality, caused by the reduced bit-rate, may often be unnoticeable by end listeners. Generally, FEC techniques provide significantly higher quality of recovery over packet loss concealment techniques, which generally extrapolate a lost packet from previous packets of the received audio stream.

A simple extension of conventional FEC would be to extend this single channel approach to multiple channels by applying a low bit rate FEC to all channels (see, e.g., Perkins). Applying low bit rate FEC to all channels may increase the bit rate in proportion to the number of channels, and can consume significant bandwidth. Accordingly, a bit rate efficient FEC technique is proposed which incorporates applying FEC to only a select subset of the channels. Specifically, an objective would be to reduce the number of FEC channels required for a multiple channel signal so as to obtain maximum quality with lower increased bit rate.

Systems and methods for providing FEC for a multi-channel audio signal having improved bit efficiency are described below. In various embodiments, a multi-microphone (e.g., three or four microphone) capture is mixed into a 1st-order Ambisonics representation. The Ambisonics capture may be further processed by applying a decorrelator and energy compaction transform, such as a Karhunen Loeve Transform ("KLT"), Singular Value Decomposition, or Principle Components Analysis. The resulting transformed channels can be encoded independently. The largest non-stationary energy variations in the sound field tend may to be packed into the highest energy components of the capture. Accordingly, significant quality benefits may be seen when these high energy components are reconstructed using a high-quality packet loss technique, such as FEC. By contrast, the lower energy components of the audio stream may tend to capture relatively stationary room ambiance, of which a high-quality reconstruction may be generated using packet loss concealment techniques. While the packet recovery process describe above can also be applied directly to the Ambisonics representation (without the energy compaction step), the quality of recovery from low-order FEC in practice may not be as high as when the additional step of energy compaction is applied.

Figure 2:
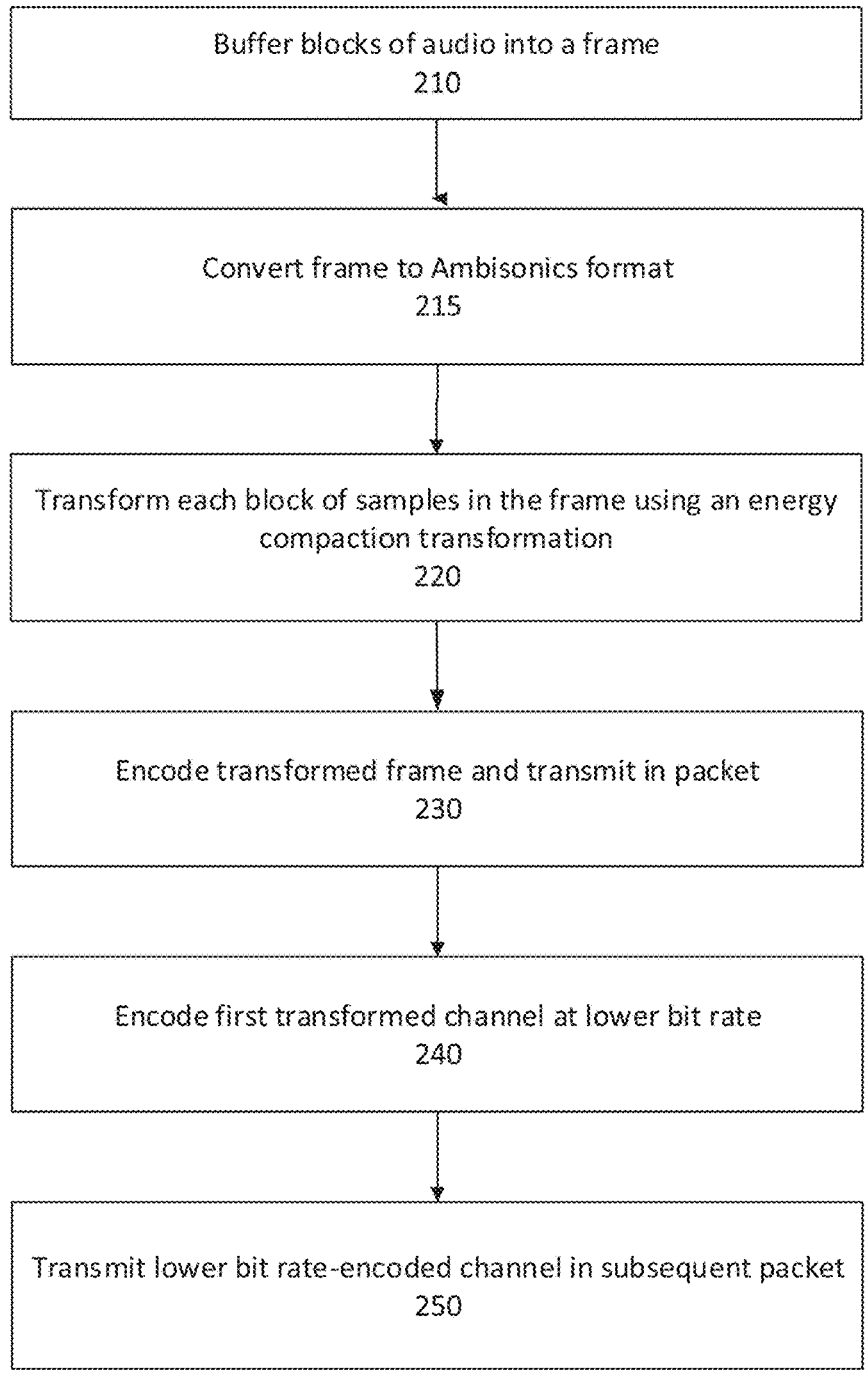
FIG. 2 shows a flow diagram for a method for providing forward error correction for a multi-channel audio signal, according to an embodiment.
Figure 3:
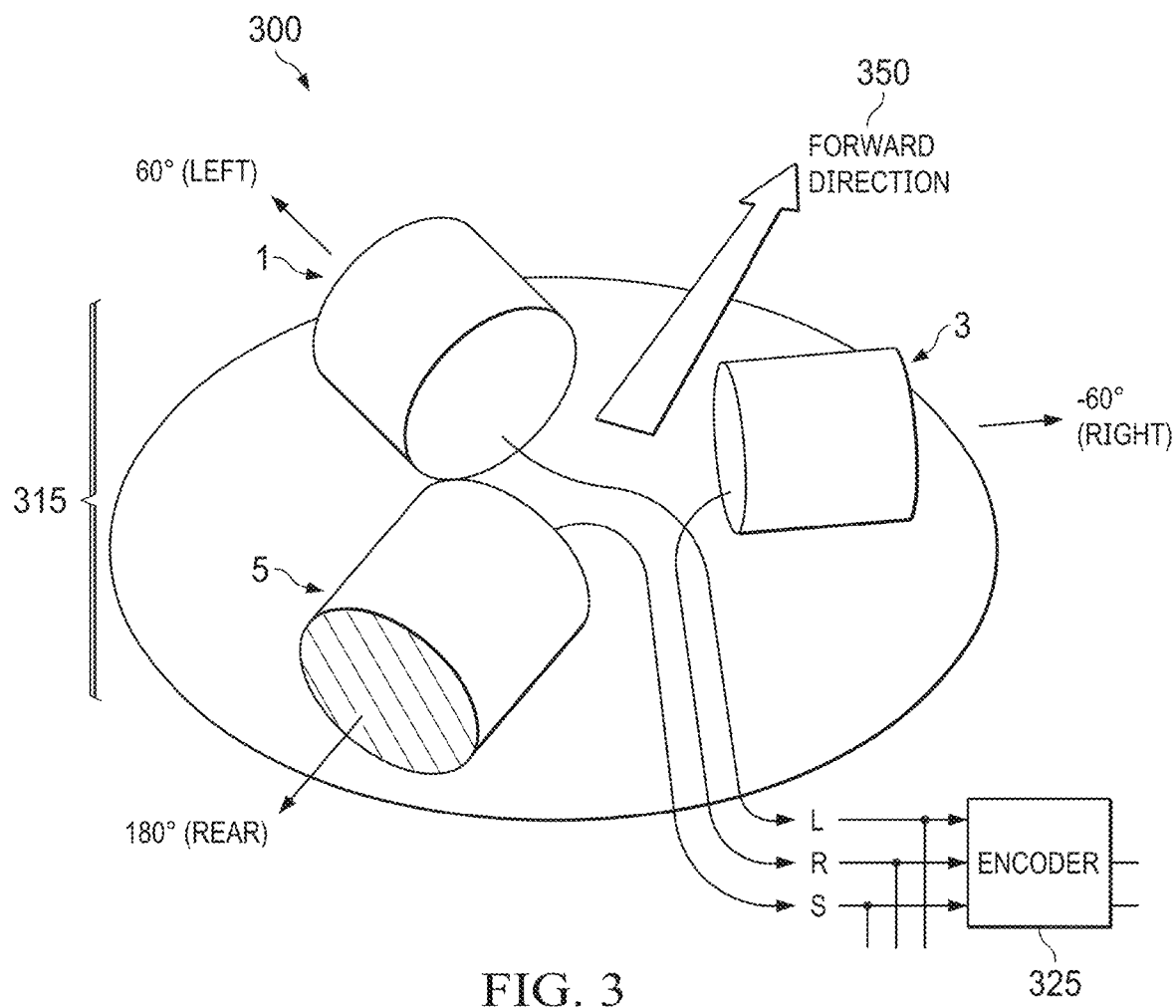
FIG. 3 shows a simplified block diagram of a system for providing forward error correction for a three-channel audio signal, according to an embodiment.
Figure 4:
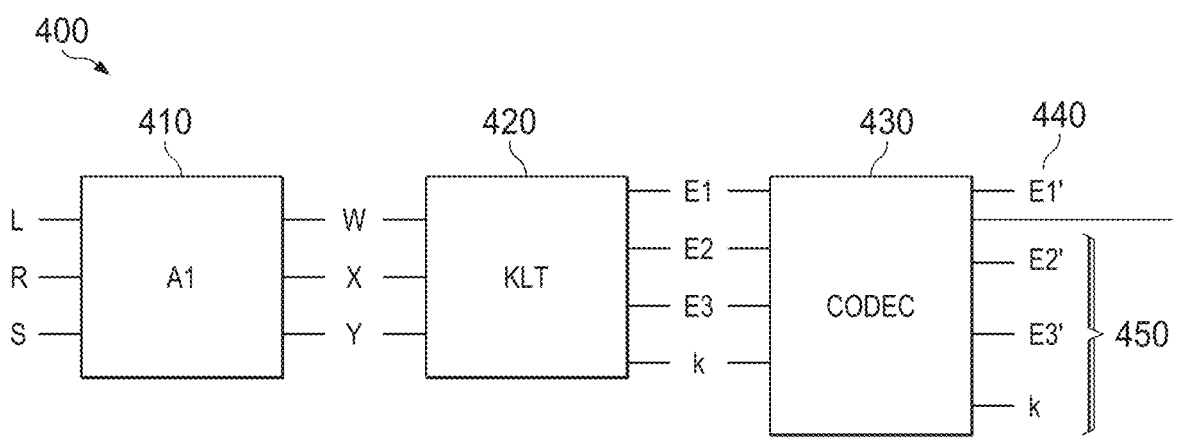
FIG. 4 shows a signal flow diagram for providing forward error correction for a three-channel audio signal, according to an embodiment.

FIG. 2 shows a flow diagram for a method 200 for providing forward error correction for a multi-channel audio signal, according to an embodiment. The method 200 will be explained with reference to a three-microphone array, as shown in FIGS. 3 and 4; however, as the description below shows, signals captured with more than three microphones may also benefit from the principles described in method 200. Additionally, the audio channels may not necessarily be constructed from a microphone capture and may represent any multi-channel audio signal. FIG. 3 shows a simplified block diagram of a system 300 for capturing a three-channel audio signal, according to an embodiment. FIG. 4 shows a signal flow diagram 400 for providing forward error correction for a captured three-channel audio signal (such as a signal captured by the system 300 of FIG. 3).

In method 200, blocks of a captured audio, which include signals from a plurality of microphones, are buffered at step 210 (by, for example, encoder 325) into a frame. System 300 illustrates an exemplary three-channel sound field microphone 315, which includes three microphones that capture sound along only a single horizontal axis. As shown in system 300, the three microphones may be oriented along a forward direction 350 such that one microphone captures a left channel, one microphone captures a right channel, and the third microphone captures a rear channel (also known as the surround channel, abbreviated by "S"). Table A illustrates an exemplary frame having three channels and m samples.

TABLE A

Exemplary frame having m samples

| L1 | L2 | L3 | L4 | ... | Lm | Channel 1 |
| R1 | R2 | R3 | R4 | ... | Rm | Channel 2 |
| S1 | S2 | S3 | S4 | ... | Sm | Channel 3 |

As shown in Table A, each channel includes time samples, which may be captured by a microphone, or retrieved from storage. The frame represents a time course of samples of length m and includes all channels of the audio stream. A block represents a single time instant from each channel (e.g., {L1, R1, S1} forms a single block). After the three channels of audio are captured and buffered into a frame, encoder 325 may be used to encode the audio channel for transmission.

Returning to FIG. 2, a mixing matrix may be applied to each block of the captured audio stream at step 215, where the mixing matrix converts the captured signals to an Ambisonics format. Signal flow diagram 400 illustrates an exemplary embodiment of the processing steps applied by the encoder 325 to the captured audio stream. As is shown in FIG. 4, mixing matrix A1 410 may be applied to each captured (L, R, S) block of audio samples to create a $1^{st}$-order Ambisonics stream, represented by (W, X, Y). The term 'channel' is used to refer to the stream of audio samples, so the stream of microphone samples L represents a single channel. Likewise, the stream of audio samples W represents a single channel. Thus, method 200 may involve either a direct map of microphone samples into an energy compacted form or include an intermediate step of transforming into WXY. While there may not be a quality or energy compaction advantage provided by using the intermediate WXY step, the W channel may be easier to use in other processing by the encoder prior to transmission due to WXY being a standard representation that is independent of microphone configuration.

Returning to FIG. 2, at step 220, a transformation, which may take the form of a mixing matrix, may be applied to each block of audio samples of a frame. The transformation of step 220 compacts the energy of each block so that the first transformed channel contains the highest energy and each subsequent transformed channel has decreasing amounts of energy. An example of such an energy compaction transform is a Karhunen Loeve Transform, a Singular Value Decomposition, or Principle Components Analysis. In the example of FIG. 4, the $1^{st}$ order Ambisonics representation (410) can be further transformed using an energy compaction mixing matrix (420), represented by (E1, E2, E3, k). The k may represent the parameters for the energy compaction matrix, noting that k typically varies with every frame but stays constant within a frame that includes multiple blocks of audio samples. A parametric representation for the KLT found in U.S. Pat. No. 9,502,046, entitled "Coding of a Sound Field Signal" and assigned to Dolby Laboratories Licensing Corporation, Dolby International Ab of the Netherlands, which is hereby incorporated by reference (and hereinafter referred to as the "'046 Patent").

An example of the energy compaction transformation is illustrated in block 420 of FIG. 4, which shows a KLT matrix (as described in the '046 Patent). The transformation of block 420 can be applied to the (W, X, Y) signal from the mixing matrix 410 to achieve the encoded signal (E1', E2', E3', k) after encoding is performed at block 430. The parameter k shown during the transformation and encoding steps in FIG. 4 may be a set of spatial parameters that defines the frame-by-frame KLT matrix. As described in the '046 Patent, in an exemplary embodiment the spatial parameters may include decomposition parameters d, $\varphi$, and $\theta$ and determine a rotation used in the transformation.

At step 230 of method 200, the transformed frame may be encoded and transmitted via packet over a network. The encoding applied at block 430 may be done using any suitable codec (e.g., EVS, Dolby Voice codec, AC-4, Opus, etc.) by encoding each channel in a frame. While generally encoding is applied to each channel for a frame of samples, in some embodiments the channels may be combined into a single encode. All encoded channels may be combined into a packet for transmission over the network. Packets generally include one frame of encoded data, but may include more than one frame in various embodiments.

Once the energy compaction transform mixing matrix for the block has been derived, a bit-efficient version of Forward Error Correction is applied by generating a low bit rate encoding of only the first channel from the energy compacted form for each block of the captured audio stream at step 240 of method 200. This low bit rate encoded channel is attached to packets that are subsequent to the transmitted packets for each encoded frame at step 250. In FIG. 4, this step may be observed as applying redundant FEC only to the encoded E1' channel 440 and allowing the E2' and E3' channels 450 (as well as the spatial parameter k) to be recovered using any suitable packet loss concealment technique. In an exemplary embodiment, the E2 and E3 are constructed from a packet received before the lost packet and the FEC parameters are found in a packet received after the lost packet was supposed to arrive. This technique ensures that PLC and k are predicted causally and thereby avoid pre-echo that is audible and annoying. By applying FEC to the lowest order basis function, greater bit efficiency may be obtained for transmission of the audio stream compared to conventional FEC (which is applied to every channel of the captured stream), while playback may still benefit from the improved accuracy provided by FEC (compared to merely using a PLC technique to regenerate a lost packet).

As stated above, the spatial encoding of the soundfield contains both the compressed media as well as side information describing the frame-by-frame KLT parameters ("k", as shown in FIG. 4). The KLT parameters may be necessary for the decoder to reconstruct an encoded block of the audio stream. The parameters, k, may be included into the FEC packet or predicted from a prior packet. In some embodiments, the k parameter is not included in the FEC packet because k varies slowly from frame to frame and thus prediction from a previous packet provides high-quality performance.

Figure 5:
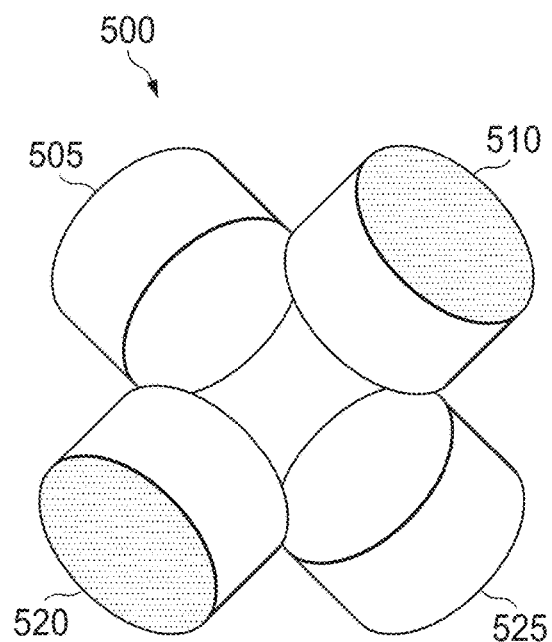
FIG. 5 shows a simplified block diagram of a system for providing forward error correction for a four-channel audio signal, according to an embodiment.
Figure 6:
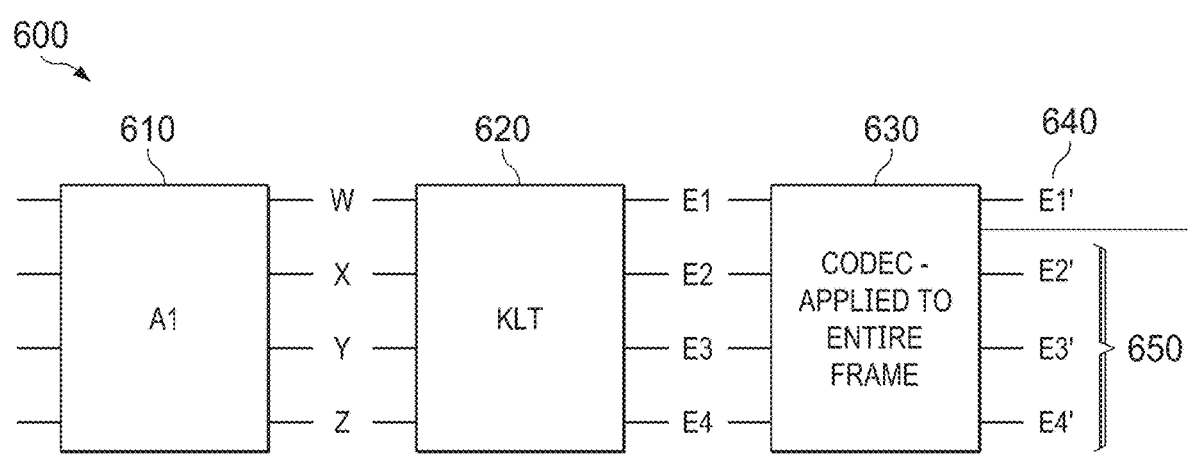
FIG. 6 shows a signal flow diagram for providing forward error correction for a four-channel audio signal, according to an embodiment.

An extension of the embodiment described in FIGS. 3-4 is to implement method with a soundfield microphone with more than three microphones. FIG. 5 shows a simplified block diagram of a system 500 for providing forward error correction for a four-channel audio signal, according to an embodiment. FIG. 6 shows a signal flow diagram 600 for providing forward error correction for a captured four-channel audio signal (such as a signal captured by the system 500 of FIG. 5). While four channels are shown in FIGS. 5-6, the invention is not limited in this regard, as method 200 may be applied to any soundfield microphone having n microphones (where n is greater than 3), albeit with a greater degree of calculation complexity with respect to applying the mixing matrix and the transform. The four-channel soundfield microphone shown in FIG. 5 includes four microphones 505, 510, 520, and 525 for capturing sound channels Lf, Lb, Rf, Rb (corresponding to left-front, left-back, right-front, and right-back channels, respectively).

As previously described, a mixing matrix A1 610 may convert the captured signals to an Ambisonics format, creating the sound field (W, X, Y, Z). The transformation of block 620 can be applied to the (W, X, Y, Z) signal from the mixing matrix 610 to create the four basis functions (E1', E2', E3', E4') after encoding is performed at block 630. Once the basis functions for the block have been derived, redundant FEC may then be applied only to the encoded E1' channel 640 and allowing the E2', E3', and E4' channels 650 (as well as the spatial parameter k) to be recovered using any suitable packet loss concealment technique.

A further extension of this concept is a higher order Ambisonics capture, e.g., from an Eigen microphone, in which case there are more basis functions and the application of FEC can be truncated at the E1' or extended to cover as many basis functions as needed to appropriately recover the signal. Applying FEC only to the 1st order Ambisonics representation (E1, E2, E3, E4) and packet loss concealment for higher order Ambisonics (E4 . . . En) is often sufficient for any order Ambisonics representation when there is low levels of packet loss. This approach can also work for parametric spatial encoded stream, where the first channel, E1, is encoded as described above, and higher order channels, E2 and E3, are encoded parametrically. In this case, the same approach is used—apply FEC to the highest energy channel and use the appropriate packet loss concealment technique for other channels.

In addition to the foregoing, transforms may be used in place of the energy compaction transforms described above that assign the energy of an audio object or multiple objects within a captured audio stream to individual channels. The transform, such as the adaptive Spherical Harmonic Transform described in U.S. Pat. No. 9,460,728, may be applied after converting the received audio frame into a higher-order Ambisonics ("HOA") representation. The adaptive Spherical Harmonic Transform may apply a rotation of the HOA representation of each frame to endeavor to focus basis functions such that individual audio objects correspond to individual channels that have greater energy than the other channels. This subset of channels, less than the total number of HOA channels, including the greatest amount of energy may then be encoded using a lower bit-rate and transmitted with subsequent packets. The number of channels n being encoded may depend on the desired quality of the reconstruction of the lost packet.

Figure 7:
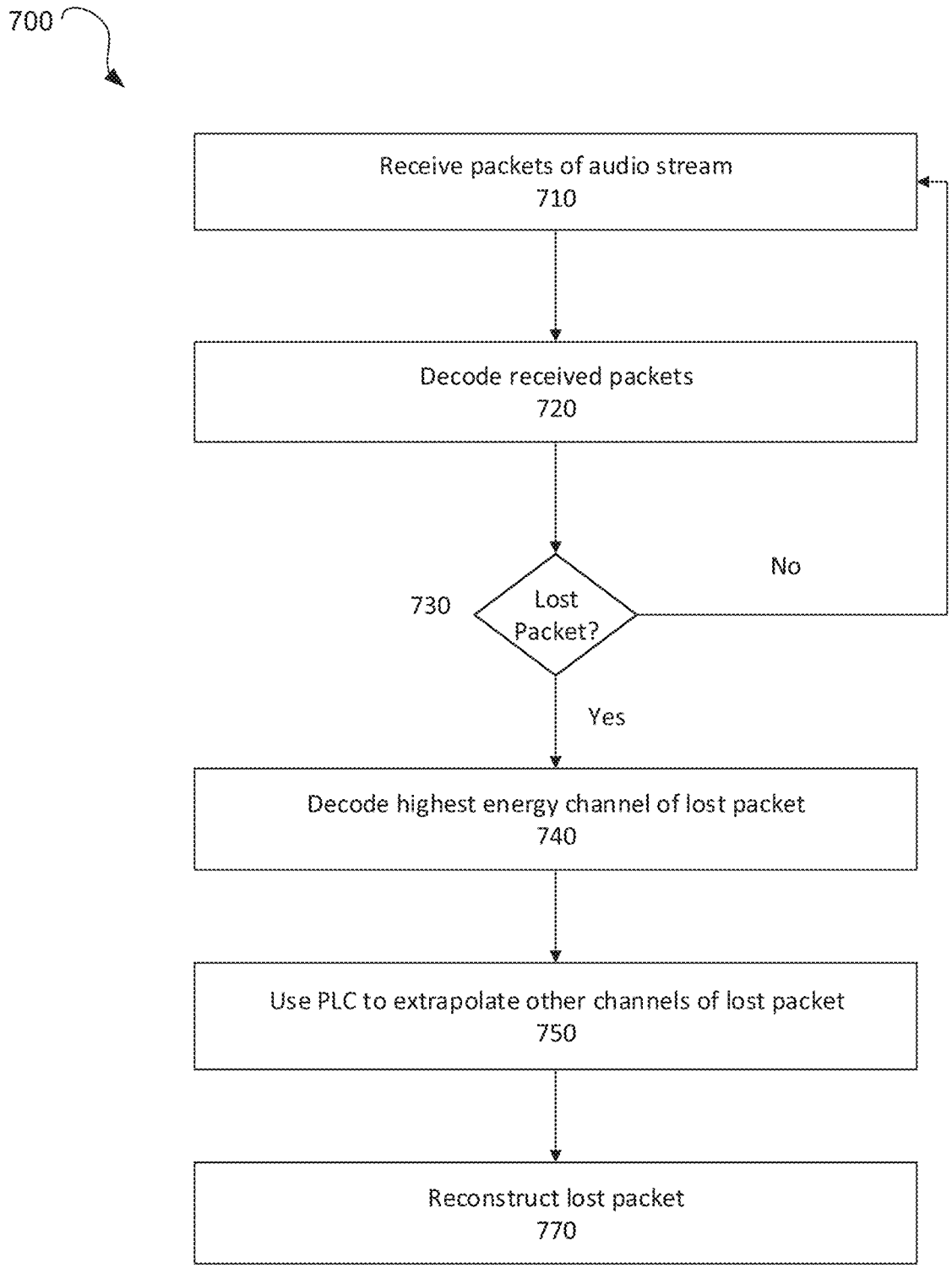
FIG. 7 shows a flow diagram for a method for providing forward error correction for a multi-channel audio signal from a decoder perspective, according to an embodiment.
Figure 8:
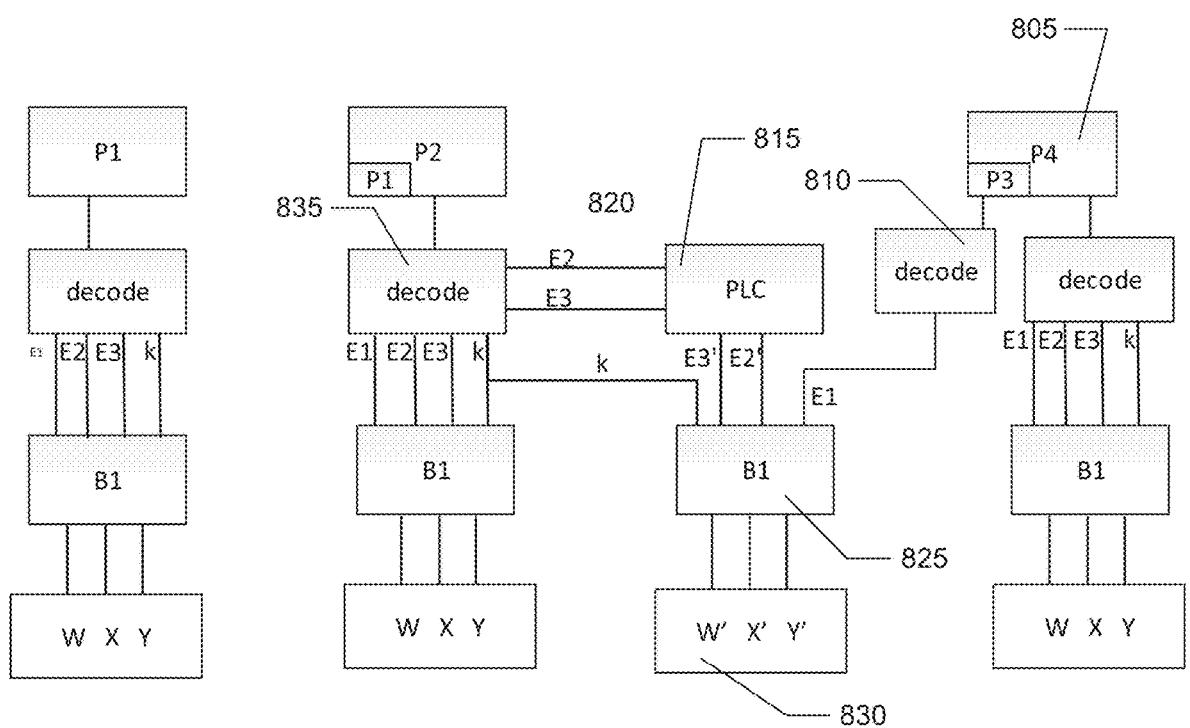
FIG. 8 shows a signal flow diagram for providing forward error correction for a multi-channel audio signal from a decoder perspective, according to an embodiment.

FEC is applied by the decoder after receiving packets of the audio stream over a network connection. FIG. 7 shows a flow diagram for a method 700 for providing forward error correction for a multi-channel audio signal from a decoder perspective, according to an embodiment. FIG. 8 shows a signal flow diagram 800 for providing forward error correction for a multi-channel audio signal from the decoder perspective, illustrating an embodiment of method 700 being applied to received packets.

At step 710, packets of a captured audio stream comprising signals from a plurality of microphones (e.g., over a network connection). As shown in diagram 800, The packets P1, P2, P4 may arrive in a jitter buffer at the receive end of a decoder. Each packet P1, P2, and P4 805 may include a plurality of channels for a block of the captured audio stream and a low bit rate-encoded form of a high energy channel of a past block of the captured audio stream. P1, being the first packet, would not include any FEC data from a past frame; however, for example packet P4 includes the high energy channel of past block P3 of the captured audio stream. While the past block P3 is the block of the captured audio stream immediately preceding received packet P4, the invention is not limited in this regard. For example, due to latency, Forward Error Correction may be used on frames two, three, or any plurality of frames after the frame corresponding to the lost packet in some embodiments.

The received packets are decoded at step 720, wherein the decoded channels for the block of the captured audio stream are used to play back the block of the captured audio stream. This may be observed in diagram 800 at block 835, where the received packet is decoded to generate basis functions (E1, E2, E3) and spatial parameters k for the block corresponding to packet P2. Accordingly, in diagram 800, P1 is decoded into WXY and P2 is decoded into WXY. However, packet P3 is not available for playback.

Returning to FIG. 7, in response to a determination that the past block of the captured audio stream has been lost at step 730, steps 740, 750, and 770 may be applied. At step 740, the low bit rate-encoded first transformed channel of the past block, located in a subsequent packet, may be decoded. Using packet loss concealment, the other transformed channels of the past block may be extrapolated at step 750. And finally, based on the decoded low bit rate-encoded first transformed channel and the extrapolated other channels, the lost past block may be reconstructed for playback at step 770. These three steps are displayed in diagram 800, where, when P4 arrives in the jitter buffer, a reconstruction of P3 is made by decoding the redundant packet, p3 (which includes the highest energy channel (i.e. the first transformed channel) of the frame corresponding to lost packet P3), located in packet P4 at block 810. An estimate of channels E2, E3 for reconstructed packet P3 may be obtained by packet loss concealment extrapolation of E2 and E3 from past packet P2 at block 815. In embodiments where energy compaction is used, spatial parameters k are used to reconstruct the lost packet P3. In some embodiments, the spatial parameters for a packet are included in the same packet as the low bit rate-encoded first transformed channel. In other embodiments, as shown in diagram 800, spatial parameters for the lost past frame are copied from a most recent available frame of the encoded audio stream and are used to reconstruct the lost past frame of the captured audio stream. The most recent available frame, meaning the most proximate frame in the received encoded audio stream to the lost frame, may be a past frame, as is shown in diagram 800, where the spatial parameters k from P2 are used (as described above) to reconstruct the lost packet P3. In other embodiments, the most recent available frame may be a subsequent frame to the lost packet (e.g., copied from packet P4). Using the decoded high energy channel E1 (from redundant packet p3) and the extrapolated E2 and E3 basis functions, an inverse of the transform applied to generate the basis functions may be applied by block 825 to generate an Ambisonics representation WXY 830 of the block of the audio stream corresponding to P3. The Ambisonics representation 830 is then rendered for playout on headphones or speakers. Any suitable mixing matrices for rendering a WXY representation for audio to various speaker configurations may be utilized to render the Ambisonics representation 830.

The low bit rate FEC payload may often be encoded at reduced bandwidth. For example, the original signal may be encoded with a bandwidth of 32 Khz but the FEC payload for the redundant packet may be limited to 8 Khz bandwidth for bit efficiency purposes. This means that the reconstructed packet may have lower bandwidth the surrounding packets. For isolated packet loss, this is usually not observable, but it may become noticeable as the packet loss rate increases. The perception of reduced bandwidth and discontinuities can be avoided if, as is done in various embodiments, a single ended blind Spectral Band Replication of the signal is performed as part of the FEC reconstruction. An example of this may be seen in U.S. Pat. No. 9,653,085, entitled "Reconstructing an Audio Signal Having A Baseband and High Frequency Components Above the Baseband" and assigned to Dolby Laboratories Licensing Corporation, Dolby International Ab of the Netherlands, which is hereby incorporated by reference.

Figure 9:
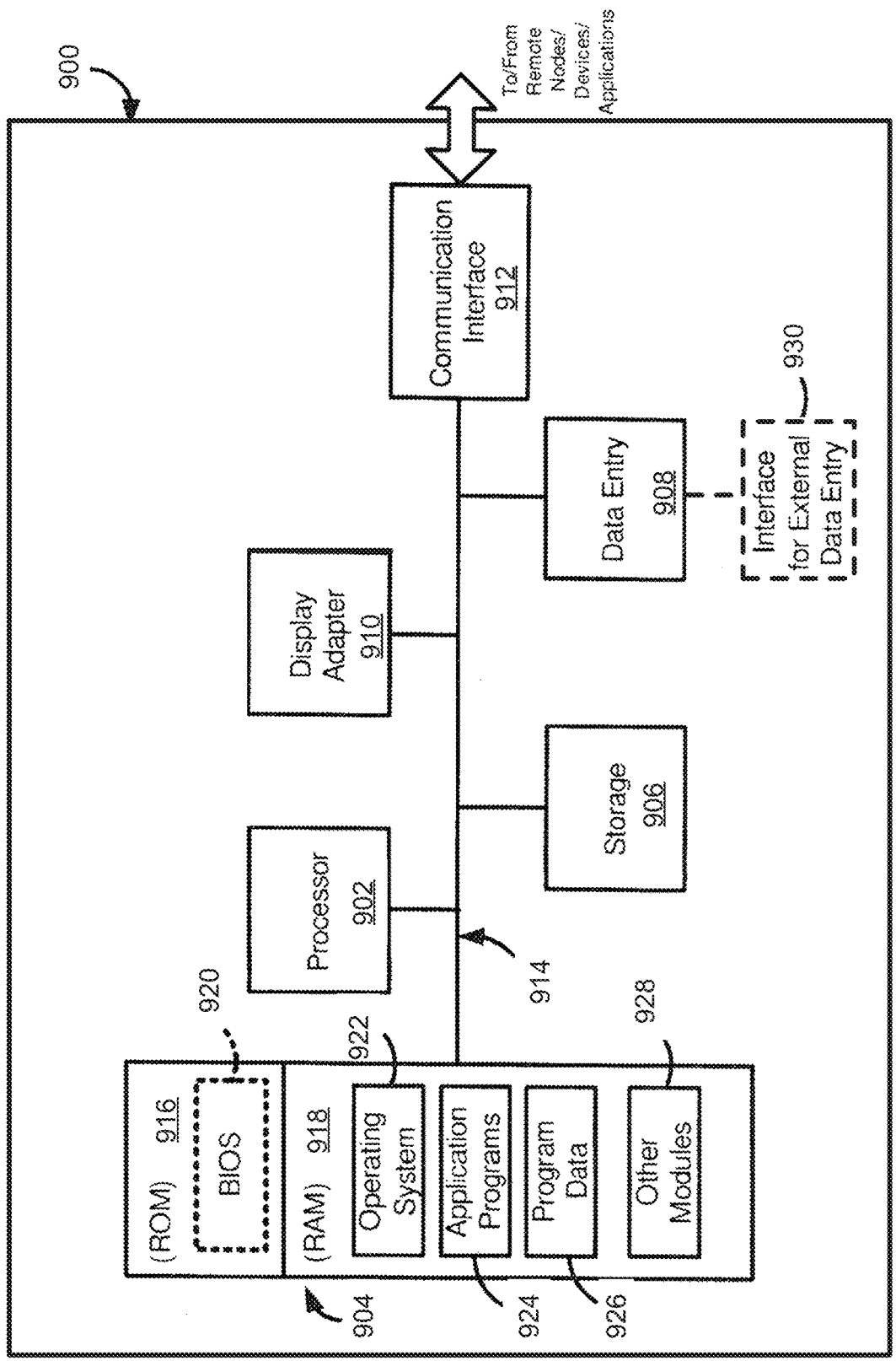
FIG. 9 is a block diagram of an exemplary system for concealing packet loss using multi-sinusoid detection, according to an embodiment.

The methods and modules described above may be implemented using hardware or software running on a computing system. FIG. 9 is a block diagram of an exemplary computing system for concealing packet loss using multi-sinusoid detection according to various embodiments of the present invention. With reference to FIG. 9, an exemplary system for implementing the subject matter disclosed herein, including the methods described above, includes a hardware device 900, including a processing unit 902, memory 904, storage 906, data entry module 908, display adapter 910, communication interface 912, and a bus 914 that couples elements 904-912 to the processing unit 902.

The bus 914 may comprise any type of bus architecture. Examples include a memory bus, a peripheral bus, a local bus, etc. The processing unit 902 is an instruction execution machine, apparatus, or device and may comprise a microprocessor, a digital signal processor, a graphics processing unit, an application specific integrated circuit (ASIC), a field programmable gate array (FPGA), etc. The processing unit 902 may be configured to execute program instructions stored in memory 904 and/or storage 906 and/or received via data entry module 908.

The memory 904 may include read only memory (ROM) 916 and random access memory (RAM) 918. Memory 904 may be configured to store program instructions and data during operation of device 900. In various embodiments, memory 904 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 904 may also include nonvolatile memory technologies such as nonvolatile flash RAM (NVRAM) or ROM. In some embodiments, it is contemplated that memory 904 may include a combination of technologies such as the foregoing, as well as other technologies not specifically mentioned. When the subject matter is implemented in a computer system, a basic input/output system (BIOS) 920, containing the basic routines that help to transfer information between elements within the computer system, such as during start-up, is stored in ROM 916.

The storage 906 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 900.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 906, ROM 916 or RAM 918, including an operating system 922, one or more applications programs 924, program data 926, and other program modules 928. A user may enter commands and information into the hardware device 900 through data entry module 908. Data entry module 908 may include mechanisms such as a keyboard, a touch screen, a pointing device, etc. Other external input devices (not shown) are connected to the hardware device 900 via external data entry interface 930. By way of example and not limitation, external input devices may include a microphone, joystick, game pad, satellite dish, scanner, or the like. In some embodiments, external input devices may include video or audio input devices such as a video camera, a still camera, etc. Data entry module 908 may be configured to receive input from one or more users of device 900 and to deliver such input to processing unit 902 and/or memory 904 via bus 914.

The hardware device 900 may operate in a networked environment using logical connections to one or more remote nodes (not shown) via communication interface 912. The remote node may be another computer, a server, a router, a peer device or other common network node, and typically includes many or all of the elements described above relative to the hardware device 900. The communication interface 912 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 912 may include logic configured to support direct memory access (DMA) transfers between memory 904 and other devices.

In a networked environment, program modules depicted relative to the hardware device 900, or portions thereof, may be stored in a remote storage device, such as, for example, on a server. It will be appreciated that other hardware and/or software to establish a communications link between the hardware device 900 and other devices may be used.

It should be understood that the arrangement of hardware device 900 illustrated in FIG. 9 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 900. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 9. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter may be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

Various aspects of the present invention may be appreciated from the following enumerated example embodiments (EEEs):

EEE 1. A method for providing forward error correction for a multi-channel audio signal, the method comprising:
 buffering blocks of an audio stream into a frame of audio the audio stream comprising a plurality of audio channels;
 applying a transformation to each block of the frame of audio, the transformation compacting the energy of each block into a plurality of transformed channels, the first transformed channel for each block containing the most energy and subsequent transformed channels containing decreasing amounts of energy;
 encoding the transformed frame;
 transmitting, over a network, the encoded frame in a packet;
 encoding the first transformed channel of the transformed frame at a lower bit rate than the encoding used for the transmitted packet; and
 transmitting, over the network, the lower bit rate-encoded channel in a packet that is subsequent to the transmitted packet.

EEE 2. The method of EEE 1, further comprising applying a mixing matrix to each block of the captured audio stream prior to applying the transformation, the mixing matrix converting the captured signals to an Ambisonics format.

EEE 3. The method of EEE 1 or EEE 2, further comprising:
 encoding a subset of the plurality of transformed channels, the subset comprising the first n transformed channels of the transformed frame at the lower bit rate, wherein n is less than the total number of transformed channels; and
 transmitting, over the network, the lower bit rate-encoded subset of transformed channels in the subsequent packet.

EEE 4. The method of any of EEEs 1-3, the encoding being performed using one of EVS, Dolby Voice Codec, AC-4, or Opus codecs.

EEE 5. The method of any of EEEs 1-4, the transformation being one of a Karhunen Loeve Transform, a Singular Value Decomposition, Principle Component Analysis, or an adaptive harmonic spherical transform.

EEE 6. The method of any of EEEs 1-5, wherein, when the subsequent packet is decoded, the lower bit rate-encoded channel is combined with packet loss concealment versions of each of the other plurality of transformed channels to create a replacement for a lost packet.

EEE 7. The method of any of EEEs 1-6, the subsequent packet also including spatial parameters for the transformed frame that parameterize the transformation, wherein, when the lower bit rate-encoded channel is used to reconstruct a lost packet, the included spatial parameters are used to reconstruct the lost packet.

EEE 8. The method of any of EEEs 1-6, wherein, when the lower bit rate-encoded channel is used to reconstruct the lost packet, the subsequent packet does not include spatial parameters for the transformed frame, and a spatial parameter of a subsequent transformed frame of audio included in the subsequent packet is used in combination with the lower bit rate-encoded channel to reconstruct the lost packet.

EEE 9. A computer program product comprising computer-readable program code to be executed by one or more processors when retrieved from a non-transitory computer-readable medium, the program code including instructions to:
  buffer blocks of an audio stream into a frame of audio, the audio stream comprising a plurality of audio channels;
  apply a transformation to each block of the frame of audio, the transformation compacting the energy of each block into a plurality of transformed channels, the first transformed channel for each block containing the most energy and subsequent transformed channels containing decreasing amounts of energy;
  encode the transformed frame;
  transmit, over a network, the encoded frame in a packet;
  encode the first transformed channel of the transformed frame at a lower bit rate than the encoding used for the transmitted packet; and
  transmit, over the network, the lower bit rate-encoded channel in a packet that is subsequent to the transmitted packet.

EEE 10. The computer program product of EEE 9, the program code further including instructions to apply a mixing matrix to each block of the captured audio stream prior to applying the transformation, the mixing matrix converting the captured signals to an Ambisonics format.

EEE 11. The computer program product of EEE 9 or EEE 10, wherein, when the subsequent packet is decoded, the lower bit rate-encoded channel is combined with packet loss concealment versions of each of the other plurality of transformed channels to create a replacement for the lost packet.

EEE 12. The computer program product of any of EEEs 9-11, the program code further including instructions to:
  encode a subset of the plurality of transformed channels, the subset comprising the first n transformed channels of the transformed frame at the lower bit rate, wherein n is less than the total number of transformed channels; and
  transmit, over the network, the lower bit rate-encoded subset of transformed channels in the subsequent packet.

EEE 13. A method for providing forward error correction for a multi-channel audio signal, the method comprising:
  receiving a packet of an encoded audio stream comprising a plurality of transformed audio channels, the packet comprising an encoded frame and a lower bit rate-encoded transformed channel of a past frame of the encoded audio stream, the lower bit rate-encoded channel being encoded at a lower bit rate than an encoding used for the encoded frame;
  decoding the encoded frame, wherein the plurality of transformed audio channels are used for play back; and
  in response to a determination that a packet corresponding to the past frame of the encoded audio stream has been lost:
    decoding the lower bit rate-encoded transformed channel of the past frame located in the received packet;
    using packet loss concealment to extrapolate other transformed channels of the past frame; and
    based on the lower bit rate-encoded transformed channel and the extrapolated transformed channels, reconstructing the lost past frame for playback.

EEE 14. The method of EEE 13, the lost past frame being located a plurality of frames prior to the encoded frame in the encoded audio stream.

EEE 15. The method of EEE 13 or EEE 14, the received packet further comprising spatial parameters for the lost past frame, wherein the spatial parameters are used to reconstruct the lost past frame of the captured audio stream.

EEE 16. The method of any of EEEs 13-15, further comprising, in response to the determination that the past frame of the encoded audio stream has been lost, applying single-ended blind Spectrum Band Replication as part of the reconstructing the lost past frame for playback.

EEE 17. The method of any of EEEs 13-16, wherein spatial parameters for the lost past frame are copied from a most recent available frame of the encoded audio stream and are used to reconstruct the lost past frame of the captured audio stream.

EEE 18. A method for providing forward error correction for a multi-channel audio signal, the method comprising:
  buffering blocks of an audio stream into a frame of audio the audio stream comprising a plurality of audio channels;
  applying a transformation to each block of the frame of audio, the transformation converting each block into an Ambisonics format comprising a plurality of channels and including a W channel, the W channel being the first of the plurality of channels;
  encoding the transformed frame;
  transmitting, over a network, the encoded frame in a packet;
  encoding the W channel of the transformed frame at a lower bit rate than the encoding used for the transmitted packet; and
  transmitting, over the network, the lower bit rate-encoded channel in a packet that is subsequent to the transmitted packet.

EEE 19. The method of EEE 18, the Ambisonics format comprising three channels.

EEE 20. The method of EEE 18 or EEE 19, the Ambisonics format comprising four channels.

EEE 21. The method of any of EEEs 18-20, the Ambisonics format being a third order Ambisonics format comprising 16 channels.

EEE 22. The method of any of EEEs 18-21, further comprising:
  encoding a subset of the plurality of transformed channels, the subset comprising the first n transformed channels of the transformed frame at the lower bit rate, wherein n is less than the total number of transformed channels; and
  transmitting, over the network, the lower bit rate-encoded subset of transformed channels in the subsequent packet.

EEE 23. The method of any of EEEs 18-22, the Ambisonics format being a third order Ambisonics format comprising 16 channels, further comprising encoding a first order Ambisonics representation of the transformed frame at the lower bit rate and transmitting the lower bit rate-encoded first order representation in the packet that is subsequent to the transmitted packet.

EEE 24. Computer program product having instructions which, when executed by a computing device or system, cause said computing device or system to perform the method according to any of the EEEs 1-8 or 13-23.

The invention claimed is:

1. A method of providing forward error correction for an audio signal, the method comprising:
  buffering blocks of an audio stream into a frame of audio, the audio stream comprising a plurality of audio channels;

transforming the frame of audio, the transforming including compacting energy of each block of the frame into a plurality of transformed channels, a respective first transformed channel for each block containing the most energy and respective other transformed channels containing decreasing amounts of energy;

encoding the transformed frame at a first bit rate;

encoding the first transformed channel of the transformed frame at a lower second bit rate that is lower than the first bit rate; and transmitting, over a network, one or more first packets for the encoded transformed frame at a first time, and one or more second packets for the encoded first transformed channel at a second time that is subsequent to the first time, wherein, the lower bit-rate encoded first transformed channel is used to reconstruct a lost packet from the transmission by combining packets from the lower bit rate encoded first transformed channel with packet loss concealment versions of each of the plurality of other transformed channels, together with a spatial parameter.

2. A non-transitory computer-readable medium storing instructions that, when executed by one or more processors, cause the one or more processors to perform operations of providing forward error correction for a multi-channel audio signal, the operations comprising:

buffering blocks of an audio stream into a frame of audio, the audio stream comprising a plurality of audio channels;

transforming the frame of audio, the transforming including compacting energy of each block of the frame into a plurality of transformed channels, a respective first transformed channel for each block containing the most energy and respective other transformed channels containing decreasing amounts of energy;

encoding the transformed frame at a first bit rate;

encoding the first transformed channel of the transformed frame at a second bit rate that is lower than the first bit rate; and transmitting, over a network, one or more first packets for the encoded transformed frame at a first time, and one or more second packets for the encoded first transformed channel at a second time that is subsequent to the first time, wherein, the lower bit-rate encoded first transformed channel is used to reconstruct a lost packet from the transmission by combining packets from the lower bit rate encoded first transformed channel with packet loss concealment versions of each of the plurality of other transformed channels, together with a spatial parameter.

* * * * *